United States Patent
Doublet et al.

(10) Patent No.: US 10,872,437 B2
(45) Date of Patent: Dec. 22, 2020

(54) FACE AUTHENTICATION METHOD

(71) Applicant: IDEMIA IDENTITY & SECURITY FRANCE, Courbevoie (FR)

(72) Inventors: Julien Doublet, Courbevoie (FR); Jean Beaudet, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 62 days.

(21) Appl. No.: 16/267,110

(22) Filed: Feb. 4, 2019

(65) Prior Publication Data

US 2019/0244390 A1    Aug. 8, 2019

(30) Foreign Application Priority Data

Feb. 6, 2018    (FR) ..................... 18 50967

(51) Int. Cl.
| | | |
|---|---|---|
| *G06T 7/73* | (2017.01) | |
| *G06K 9/00* | (2006.01) | |
| *G06F 21/32* | (2013.01) | |

(52) U.S. Cl.
CPC .............. *G06T 7/74* (2017.01); *G06F 21/32* (2013.01); *G06K 9/00288* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 8,457,367 B1 | 6/2013 | Sipe et al. | |
| 9,477,829 B2 | 10/2016 | Zhao et al. | |
| 2010/0100406 A1* | 4/2010 | Lim | ..................... G06Q 20/382 |
| | | | 705/325 |
| 2014/0037155 A1* | 2/2014 | Faria | ....................... G07C 9/37 |
| | | | 382/118 |

(Continued)

FOREIGN PATENT DOCUMENTS

WO    2017/100929 A1    6/2017

OTHER PUBLICATIONS

Fabio Remondino, 3-D reconstruction of static human body shape from image sequence, Computer Vision and Image Understanding, (Year: 2003).*

(Continued)

*Primary Examiner* — Mohammed Rachedine
(74) *Attorney, Agent, or Firm* — Womble Bond Dickinson (US) LLP

(57) ABSTRACT

The invention relates to a method for authenticating a face presented to a device comprising the steps in which the imager acquires an initial image of a face, the processing unit determines a pose of the face from the initial image, and determines a reference pose and a target position placed randomly or pseudo-randomly in a target space, the screen displays a displayed image (6) comprising at least one visual orientation mark (7) initially at a reference position, and a visual target (8) at the target position, updated by moving the visual orientation mark (7) according to the successive poses of the face, and the processing unit authenticates the face presented if there is a match between the position of the visual orientation mark (7) and the target position where the visual target is located (8).

12 Claims, 3 Drawing Sheets

(56) References Cited

U.S. PATENT DOCUMENTS

Figure 1:
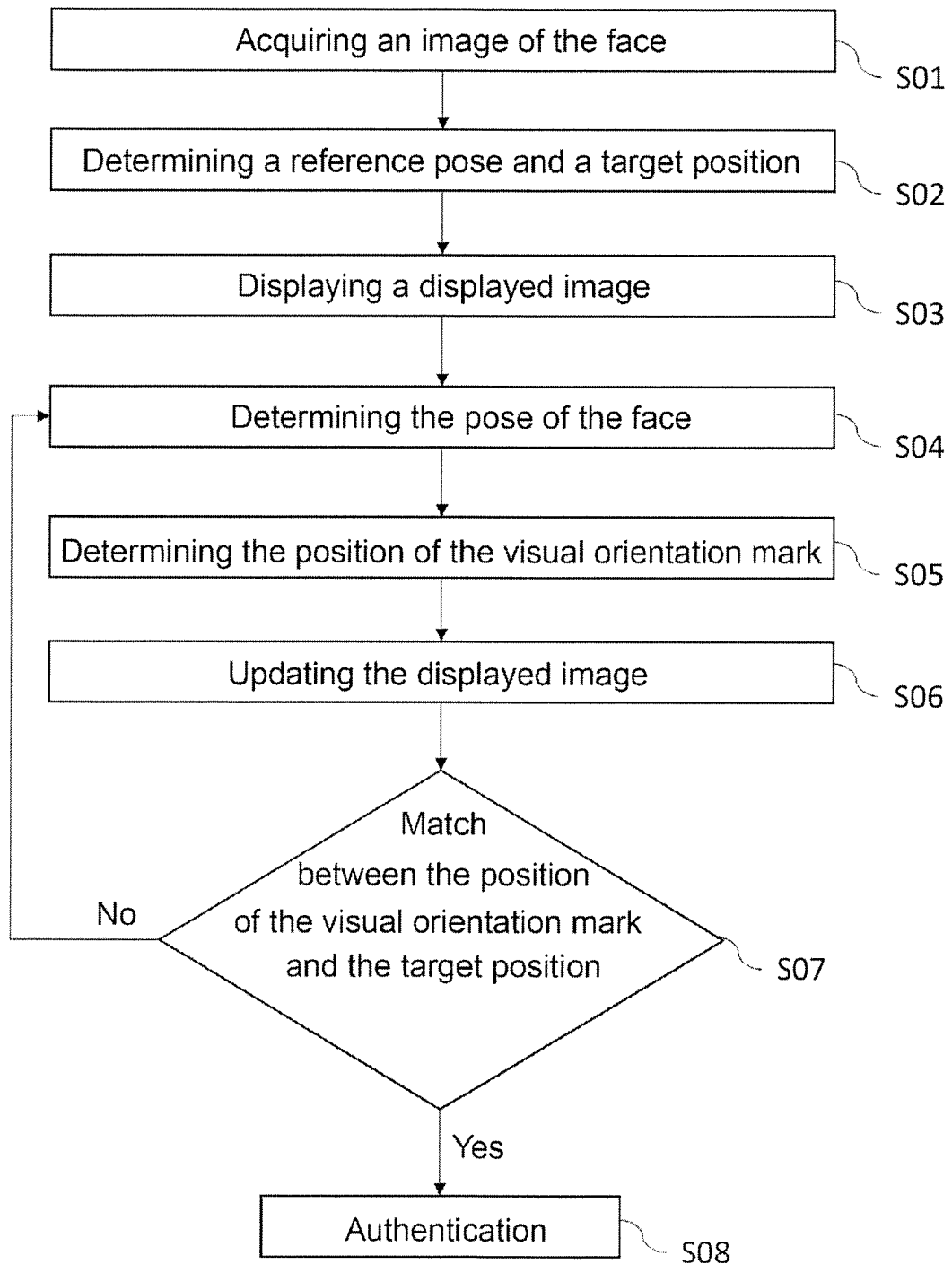

| | | | |
|---|---|---|---|
| 2014/0183269 A1* | 7/2014 | Glaser | G06Q 20/34 |
| | | | 235/492 |
| 2015/0341370 A1* | 11/2015 | Khan | H04L 63/0861 |
| | | | 726/30 |
| 2017/0124385 A1 | 5/2017 | Ganong et al. | |
| 2018/0124047 A1* | 5/2018 | Fisher | G06F 21/31 |
| 2019/0295250 A1* | 9/2019 | Zhang | G06T 7/33 |

OTHER PUBLICATIONS

Xie, Pengqing, "Facial movement based human user authentication", Graduate Thesis and Dissertations, Iowa State University, 2014, pp. 1-51.

Preliminary Research Report received for French Application No. 1850967, dated Aug. 10, 2018, 3 pages (1 page of French Translation Cover Sheet and 2 pages of original document).

Patacchiola et al., "Head Pose Estimation in the Wild using Convolutional Neural Networks and Adaptive Gradient Methods", Pattern Recognition, vol. 71, Nov. 2017, pp. 132-143.

Galbally et al., "Biometric Antispoofing Methods: A Survey in Face Recognition", IEEE Access, vol. 2, 2014, pp. 1530-1552.

European Search Report received for EP Patent Application No. 19155210, dated Apr. 8, 2019, 2 pages of Original Document Only.

\* cited by examiner

FACE AUTHENTICATION METHOD

TECHNOLOGICAL CONTEXT AND BACKGROUND

The present invention belongs to the field of biometrics, and relates more specifically to a method for authenticating a face.

Some identification or identity verification methods need to acquire an image of the face of the person wishing to claim an identity. It may be, for example, biometric identification methods, based on the analysis of elements of the face to carry out an identification. It may also be the comparison of the person's face with photographs identifying said person, in particular when submitting identity documents such as a passport. Finally, access control methods based on facial recognition have recently emerged, in particular to unlock a smart mobile phone, as in U.S. Pat. No. 9,477,829.

However, the implementation of these methods requires to be guarded against fraud consisting in presenting, to the imager acquiring the image of the face, a reproduction of the face, such as a photograph. To this end, methods for authenticating the face, that is to say detecting possible fraud, have been developed. Most of these methods rely on the analysis of an imposed movement, generally called challenge. Thus, the person whose face is presented to the imager is for example asked to perform specific actions such as blinking, smiling or nodding. However, such methods have proved to be vulnerable to fraud based on video presentation, videos in which a face performs the requested challenge.

Patent application US 2017/0124385 A1 describes a user authentication method based on a challenge, i.e. the user must perform an imposed sequence of movements. More specifically, the system asks the user to stand first in a rest position facing the camera, where it acquires a first feature of the face, then it asks him to turn in order to acquire a second feature of the face. Authentication is done by comparing the features in order to detect an inconsistency representative of a fraud. The fraud-resistance having such an approach is however not perfect.

PRESENTATION OF THE INVENTION

The aim of the invention is to overcome at least partially these drawbacks and preferably all of them, and aims in particular to propose a method for authenticating a face presented to a device allowing to detect fraud, which is at the same time simple, robust and effective against video presentation.

To this end, there is provided a method for authenticating a face presented to a device comprising an imager, a screen and a processing unit, comprising the steps in which:
the imager acquires at least one initial image of a face presented in its acquisition field,
the processing unit determines a pose of the face from the initial image, and from this face pose, determines a reference pose, a face pose being defined by at least two angles representative of the orientation of the face appearing in an image, and a target position placed randomly or pseudo-randomly in a target space at a distance from a reference position corresponding to the reference pose, said target position corresponding to a target pose,
the screen displays a displayed image comprising at least one visual orientation mark initially at the reference position determined from the pose of the face in the initial image, and a visual target at the target position,
the imager acquires a stream of images of the face presented in its acquisition field, and for a plurality of successive images of said image stream:
the processing unit determines a pose of the face in each image of the plurality of successive images,
the processing unit determines successive positions of the visual orientation mark according to the successive poses of the face with respect to the reference pose in the plurality of successive images,
the image displayed by the screen is updated by moving the visual orientation mark according to its successive positions determined according to the successive poses of the face with respect to the reference pose in the plurality of successive images,
the processing unit authenticates the presented face when, following the displacement of the visual orientation mark, there is a match between the position of the visual orientation mark and the target position where the visual target is located, corresponding to a match between the face pose and the target pose, otherwise the face presented in the acquisition field is considered as fraud.

The method is advantageously completed by the following characteristics, taken alone or in any of the technically possible combinations thereof:
the target space extends on either side of the reference position;
the target space corresponds to angular ranges of the pose angles defining a plurality of possible target positions;
the angles representative of the orientation of the face appearing in the image comprise a yaw angle about a vertical axis and a pitch angle about a horizontal axis, the angular ranges extending between ±10° and ±20° with respect to the angles of the reference pose;
the processing unit defines the target space also according to user data and/or elements contained in the initial image;
a time is allotted at the expiry of which, in the absence of match between the position of the visual orientation mark and the target position where the visual target is located, the face presented in the acquisition field, is considered as fraud;
the match between the position of the visual orientation mark and the target position where the visual target is located, needs to be maintained for a predetermined duration before the processing unit authenticates the face;
when the processing unit determines a reference pose, the processing unit transmits an order of movement of the face if the face pose does not correspond to a front view of the face;
the authentication of the presented face is also conditioned by the determination of the three-dimensional appearance of the presented face by implementing a photogrammetric reconstruction technique based on the movement from at least two face images of the image stream corresponding to two different poses;
the processing unit determines, for the plurality of successive images of the image stream, a direction of the face gaze by identifying the orientation of the eyes of said face on the acquired images, the authentication of the presented face is also conditioned on a gaze in the direction of the visual orientation mark and/or the visual target.

The invention also relates to a computer program product comprising program code instructions recorded on a non-transitory medium usable in a computer for performing the steps of a method according to the invention when said program is executed on a computer using said non-transitory medium.

The invention finally relates to a device comprising an imager, a screen and a processing unit, said device being configured to implement a method according to the invention.

PRESENTATION OF THE FIGURES

Figure 2:
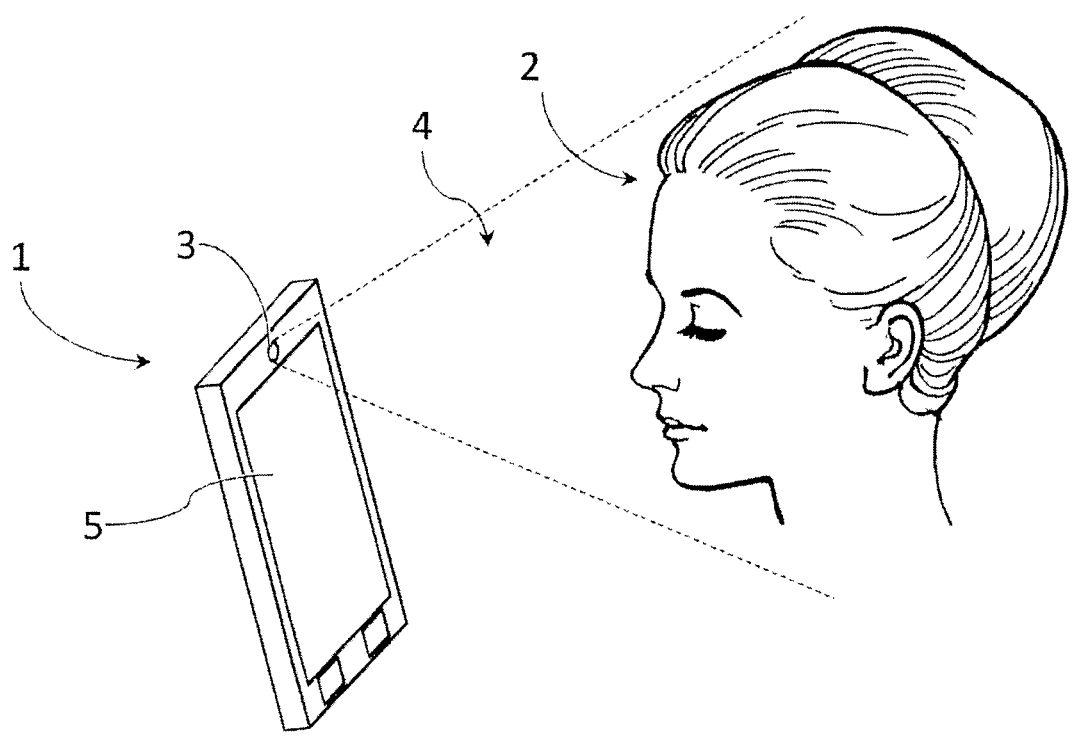
Figure 3:
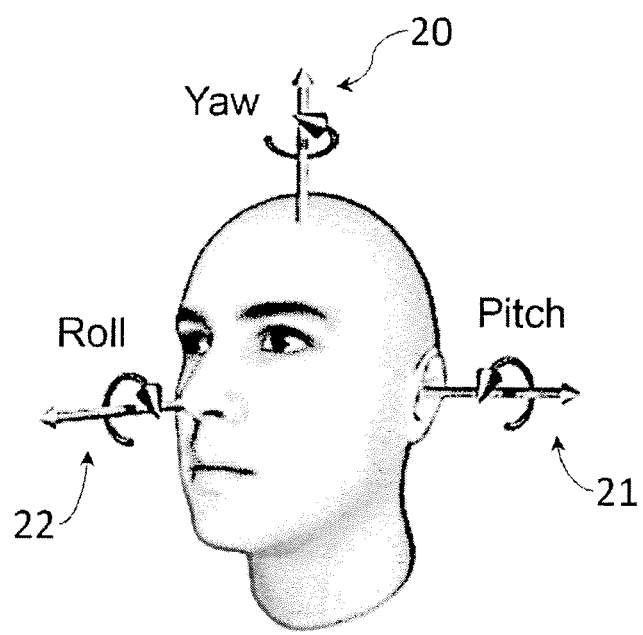
Figure 4A:
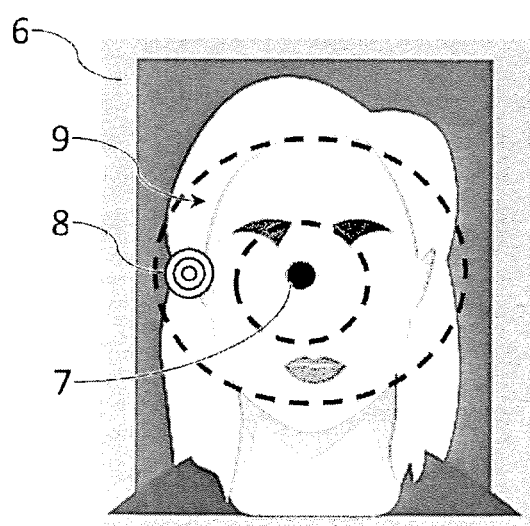
Figure 4B:
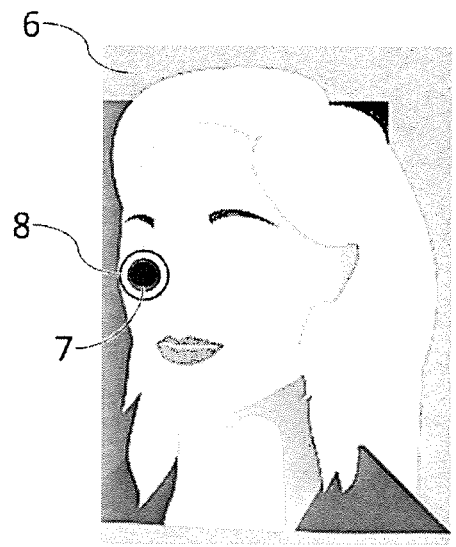
Figure 5A:
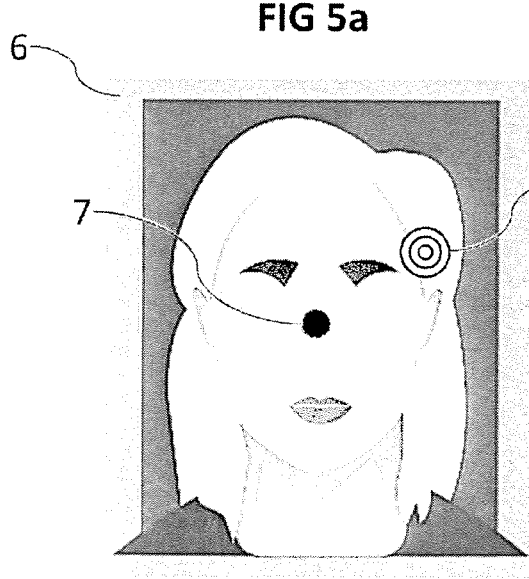
Figure 5B:
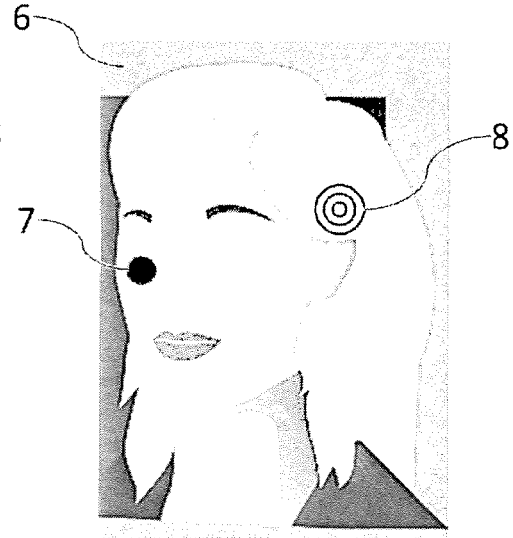

The invention will be better understood thanks to the following description which refers to embodiments and variants according to the present invention, given by way of non-limiting examples and explained with reference to the appended schematic drawings, in which:

FIG. 1 shows a block diagram of steps implemented in the authentication method,

FIG. 2 schematically shows a person presenting his face to a device during the implementation of the method, FIG. 3 schematically shows the angles defining the pose of a face, FIGS. 4a and 4b show schematic examples of images displayed during a successful authentication, the presented face being considered as an authentic face, FIGS. 5a and 5b show schematic examples of images displayed during a failed authentication, the presented face being considered as fraud.

DETAILED DESCRIPTION

With reference to FIG. 2, the authentication method is implemented by means of a device 1 to which a face 2 of a user is presented. The device 1 comprises a processing unit, an imager 3 adapted to acquire images of objects presented in its acquisition field 4, and a screen 5 capable of displaying images to the user. More specifically, the device 1 is configured so that the user can simultaneously present his face 2 in the acquisition field 4 of the imager 3, and look at the screen 5. The device 1 can thus be for example a smartphone-type handheld device, which has typically a suitable configuration between the imager 3 and the screen 5. The device 1 can nevertheless be any type of computerized device, and can particularly be a fixed terminal dedicated to the identity checks, for example installed in an airport. The processing unit comprises at least one processor and a memory, and allows executing a computer program for the implementation of the method.

The user presents his face 2 in the acquisition field 4 of the imager 3. The imager 3 acquires at least one initial image of the face 2 (step S01). From the image of the face, the processing unit determines a pose of the face, that is to say its orientation. As illustrated in FIG. 3, the orientation of the face can be described by three angles reflecting rotations about axes defined by the common configuration of the faces. Indeed, a face includes a bottom (towards the neck), a top (the forehead/the hair), a face where the mouth and the eyes are fully visible, and two sides where the ears are located. The different elements composing a face are distributed according to obvious geometrical criteria in a front view: the mouth is below the nose, the eyes are on the same horizontal line, the ears are also on the same horizontal line, the eyebrows are above the eyes, etc.

It is therefore easy to define for the face, from its image, an orientation with respect to the device 1 based on the rotation of the face about a vertical axis and at least one horizontal axis. FIG. 3 shows a typical example of locating the orientation of a face according to three angles about three orthogonal axes: a yaw angle about a vertical axis 20, a pitch angle about a first horizontal axis 21, and a roll angle about a second horizontal axis 22 roll angle The rotation about the vertical axis 20 corresponds to the rotation of the head from left to right. The first horizontal axis 21 corresponds to a horizontal axis about which the head turns during a nodding. The second horizontal axis 22 corresponds to a horizontal axis comprised in a plane of symmetry of the face, cutting the nose and the mouth and separating the eyes. The rotation about this second horizontal axis 22 corresponds to a head tilt to the left or to the right.

If the three angles can be used to define the pose, the roll angle may, however, not be used because of the low amplitude of rotation of a face in that direction and of the discomfort that can be provided by this rotation. The pose can therefore be defined by at least two angles representative of the orientation of the face appearing in the image, which are preferably the yaw angle and the pitch angle.

There are many known methods allowing to estimate the pose of a face from one or more image(s) of that face. It is possible for example to use a pose estimation method based on a deep learning implemented by means of a convolutional neural network. The article *"Head Pose Estimation in the Wild using Convolutional Neural Networks and Adaptive Gradient Methods"* by M. Patacchiola and A. Cangelosi, Pattern Recognition vol. 71, November 2017, pages 132-143, presents an example of a method that can be implemented to determine the pose of the face.

Once the pose of the face is determined from the image of the face, the processing unit determines a reference pose (step S02). This reference pose will be subsequently used as a reference for face poses. This reference pose may correspond directly to the pose of the face. Preferably, however, the reference pose must meet certain characteristics, and particularly present the face sufficiently frontally to allow a good application of the authentication method, and possibly of the identification method. Thus, when the processing unit determines a reference pose, the processing unit transmits an order of movement of the face if the pose of the face does not correspond to a front view of the face. It is considered here that the front view implies yaw and pitch angles less than 5° with respect to an exact alignment of the second horizontal axis 22 (i.e., the axis of the nose), with the viewing direction. The order of movement is communicated to the user by any means, such as for example by the display on the screen 5 of an instruction text asking the user to stand in front of the imager 3, or by an audio message.

To this reference pose corresponds a reference position, which will be subsequently used as a position reference. For the sake of simplicity, it is possible to define the reference position as being a central position. Indeed, the reference position is preferably predetermined and immutable. However, it is possible to plan defining the reference position according to the content of the acquired initial image, for example to match it with an element of the face. The processing unit also determines a target position.

The screen 5 displays a displayed image comprising at least one visual orientation mark initially at the reference position, and a visual target at the target position (step S03). FIG. 4a shows an example of such a displayed image 6. Thus, as illustrated, the displayed image 6 preferably includes the representation of the face previously acquired by the imager 3. There is a visual orientation mark 7 represented here by a black circle. Other shapes, patterns or colors can be considered. For example, if it is desired to use the roll angle, it is preferable to use then a visual orientation mark 7 having an asymmetry by any rotation, for example a visual reference mark 7 having a pattern such as a cross or a square shape, so that the roll change of the face 2 can be reflected by a rotation of the visual orientation mark 7 which is visually perceptible. In the illustrated case, the reference position where the visual orientation mark 7 is initially located is in the center of the image.

There is also the visual target 8, here represented by three concentric circles, placed at a target position. The target position, and thus this visual target 8, is placed randomly or pseudo-randomly in a target space at a distance from the reference position. FIG. 4a shows an example of a target space 9, represented by two dotted concentric ovals centered on the reference position. Many other target spaces are possible. It should be noted that the target space does not appear in the displayed image 6 that the screen 5 displays, and that this representation is given only for illustration purposes. The target space 9 represents the set of possible target positions.

This target space 9 corresponds to angular ranges of the pose angles defining a plurality of possible target positions. There is indeed equivalence between the pose angles and the positions in the displayed image 6. This equivalence can be interpreted as a frame change. Thus, by noting that X and Y are the coordinates of a position in the displayed image, X and Y can be expressed as a function of the yaw and pitch angles, considering the reference position at the center of the image and the reference pose as having zero yaw and pitch angles:

$$\begin{cases} x = \dfrac{k_1 \times \text{yaw angle}}{90} \times \text{image width} + \dfrac{\text{image width}}{2} \\ y = \dfrac{k_2 \times \text{pitch angle}}{90} \times \text{image height} + \dfrac{\text{image height}}{2} \end{cases}$$

wherein $k_1$ and $k_2$ are amplification factors that can be equal, and the angles are in degrees. This is a non-limiting example, other formulae can be used, for example with angles in radians, different maximum angles (here of ±90°), or a non-centered reference position. It is even possible to use nonlinear formulae.

There is a bijection between a position on the displayed image and a pose of the face. Thus, the target position corresponds to a target pose. It is also possible that the processing unit determines a target pose in a target space 9 (this time angular space), and deduces a target position therefrom. The user will have to change the pose of his face 2 so that it corresponds to the target pose. Due to the link between a position in the image and a pose of the face, it is preferable to restrict the possible target positions to target poses that can be comfortably performed by a user, that is to say to restrict the angular ranges to which the target space 9 corresponds. In addition, it is preferable to restrict the possible target positions to target poses requiring a sufficiently significant pose change, that is to say a target position at a distance from the reference position. Consequently, the angular ranges defining the target space 9 preferably extend between ±10° and ±20° with respect to the angles of the reference pose, at least for both used angles (yaw angle and pitch angle). Preferably, the target space 9 extends on either side of the reference position, for example on the right and on the left, and not on only one side.

It is possible that the processing unit defines the target space 9 also according to user data and/or elements contained in the image, for example by restricting the target space 9. It is possible for example to change the location or the extent of the target space 9 according to the disposition of the face in the initial image. It is also possible to adapt the target space 9 in order to take into account physical characteristics of the user, such as his height, his age or a possible handicap. Since the target space 9 is preferably defined with respect to the reference position, it is possible to change the target space 9 by moving the reference position, which can also be placed according to user data and/or elements contained in the image.

The target space 9 has continuity at least piece-wise, that is to say it covers one or more extent(s) on the displayed image 6. There is therefore a large number of possible target positions, at least more than 100, even more than 1000. In fact, the continuity of the target space 9 covers a quasi-infinite number of possible target positions. Since the target position is placed randomly or pseudo-randomly in the target space 9, the target position changes each time the method is implemented. It is therefore not possible for a fraudster to predict in advance where the target position will be, nor to predict all possible target positions. As a result, it is inoperative to present to the imager 3 a video representing a face taking target poses based on previous implementations of the method, since the target position varies between each iteration of the method.

After the displayed image 6 has appeared on the screen 5, the user must match the position of the visual orientation mark 7 with the target position, by moving the visual orientation mark 7 to the visual target 8. To do so, the user changes the pose of his face, which change is reflected by the displacement of the visual orientation mark 7. The imager 3 then acquires a stream of images of the face 2 presented in its acquisition field 4, and the processing unit analyzes a plurality of successive images of said image stream in order to update the displayed image 6 to inform on the displacement of the visual orientation mark 7 reflecting the changes in the pose of the face 2.

Thus, for each of the successive images, the processing unit determines the pose of the face appearing in the image (step S04). The pose of the face is determined in relation to the reference pose. From the pose of the face, the processing unit determines an updated position of the visual orientation mark 7 in the displayed image 6 (step S05). The image displayed 6 by the screen 3 is updated by moving the visual orientation mark according to its updated position (step S06). As illustrated, it is preferable to also display each acquired successive image, so that the user can see his face on the screen 5. The image stream corresponds, in fact, to a video and the reiteration of the procedure follows the frame rate of the video.

This procedure is repeated as long as authentication or fraud detection conditions are not met. At each image or at certain time intervals, the processing unit checks whether authentication or fraud detection conditions are met. Particularly, the processing unit checks whether there is match between the position of the visual orientation mark and the target position (step S07), which corresponds to a match between the face pose and the target pose. It is well understood that the match must be dealt with a tolerance interval around the target position, it would not be reasonable to require a pixel-precise tolerance. Preferably, the visual target 8 has a certain surface, and it is considered that there is match when the visual orientation mark 7, or at least part of it, covers at least part of the surface of the visual target 8.

Preferably, it is required that the entire visual orientation mark 7 covers at least part of the surface of the visual target 8. This is the case illustrated in FIG. 4b.

When there is match between the position of the visual orientation mark and the target position, the processing unit authenticates the presented face 2 as corresponding to an authentic face, that is to say not being a fraud. However, if this match is a necessary condition, it is preferably not sufficient. It is preferable to add stability and time criteria conditioning authentication of the face. As an example of a stability criterion, it can be provided that the match between the position of the visual orientation mark and the target position needs to be maintained for a predetermined duration before the processing unit authenticates the presented face 2. Such a predetermined duration can be for example greater than 0.5 seconds, and preferably greater than 1 second, or even 1.5 or 2 seconds. Thus, a fraud based on the presentation of a video where a face would quickly perform different poses in the hope that one of them corresponds to the target pose, would not be effective, since holding each pose for the predetermined duration would be too long. Moreover, there is thus protection against an accidental match that would occur transiently during a movement of the face presented when the target position would be in the path of the visual reference mark 7.

Face authentication can also be conditioned by determining the three-dimensional appearance of the presented face 2 by implementing a movement-based photogrammetric reconstruction technique from at least two images of the face of the image stream corresponding to two different poses. It is in particular possible to implement a Simultaneous Localization and Mapping (SLAM) technique. Other conditions may result from the implementation of different fraud detection methods, in particular to detect fraudulent artifacts such as Moire detection, representative of the artificial appearance of the presented face 2.

The direction of the gaze can also allow improving the face authentication modalities. Typically, if the gaze is not directed toward the visual orientation mark 7 or the visual target 8, the face may be considered as fraudulent. Indeed, in order to move the visual orientation mark 7, it is necessary for the user, on the one hand, to locate the visual target 8 at the target position, and therefore look at it, at least at the beginning and, on the other hand, to control the displacement of the visual orientation mark 7 by looking at it. Thus, if the user's face gaze should be oriented in a direction other than either of these positions (which should normally tend to get closer), such a singularity would be a strong indication that the face is not authentic.

Therefore, the processing unit preferably determines, for the plurality of successive images of the image stream, a direction of the face gaze by identifying the orientation of the eyes of said face, and the authentication of the presented face 2 is then also conditioned on a gaze of the face in the direction of the visual orientation mark and/or of the visual target. If the gaze of the face is in a direction too far from the visual orientation mark and/or from the visual target, the presented face 2 is not authenticated. It is even possible to take into account the correlation between the displacement of the direction of the face gaze and the successive positions of the visual orientation mark to estimate if the tracking of the displacement of the visual orientation mark by the gaze corresponds to an authentic face.

Moreover, a time is allotted at the expiry of which, in the absence of match between the position of the visual reference mark 7 and the target position, the face 2 presented in the acquisition field 4 is considered as fraud. For example, this allotted time may be less than 10 seconds, or even less than 5 seconds, counted between the appearance of the visual target 8 and the end of the method. This allotted time allows to temporally restrict the execution of the method, and allows in particular to avoid a fraud based on the presentation of a video where a face would perform different poses in the hope that one of them corresponds to the target pose, because of the time required to do so, especially if the maintenance of the target pose for a predetermined time is required.

Thus, if the authentication conditions, including a match between the position of the visual orientation mark and the target position, are met, the processing unit authenticates the presented face 2 (step S08). The authentication of the presented face 2 can then be used to continue identification conducted in parallel.

Conversely, if at the end of an allotted time, the authentication conditions have not been met, the face is considered as fraud. Thus, in the example of FIGS. 5a and 5b, the visual target 8 is disposed at the top right of the displayed image 6. The reference position, where the visual orientation mark 7 is initially positioned, is central, as FIG. 4a. In response to the display of the displayed image 6 by the screen 5, the presented face 2 performs a pose change which brings the visual orientation mark 7 on the left of the displayed image 6. It is the location which was that of the visual target 8 in the example of FIGS. 4a and 4b. It is therefore probably a fraud based on the presentation of a video replaying a previous response to the challenge proposed by the method. Nevertheless, since the positioning of the visual target 8 changes with each implementation of the method, and since there is a quasi-infinite number of possible target positions, knowledge of a previous implementation of the method does not allow the fraudster to authenticate the presented face 2. In this case, since the visual orientation mark 7 clearly does not clearly match with the visual target 8, when the allotted time has elapsed, the challenge is considered as failed and the face 2 presented in the field acquisition 4 is considered as fraud.

In such a case, a fraud alert can be set up, for example by preventing identification conducted in parallel, and/or alerting security personnel. It is also possible to provide an information to the user informing him of the failure of authentication of the presented face. As it is a first failure, it is possible to re-implement the method in order to give the user a second chance.

The invention is not limited to the embodiment described and shown in the appended figures. Modifications remain possible, especially from the point of view of the constitution of the various technical characteristics or by substitution of technical equivalents, without departing from the field of protection of the invention.

The invention claimed is:

1. A method for fraud detection during an authentication of a face presented to a device comprising an imager, a screen and a processing unit, comprising the steps in which:

the imager acquires at least one initial image of a face presented in the acquisition field of the imager, the processing unit determines a pose of the face from the initial image, and from this face pose, determines a reference pose, a face pose being defined by at least two pose angles representative of an orientation of the face appearing in an image, and the processing unit determines a target position placed randomly or pseudo-randomly in a target space at a distance from a reference position corresponding to the reference pose, said target position corresponding to a target pose of the face, the screen displays a displayed image comprising at least one visual orientation mark initially at the reference position determined from the pose of the face in the initial image, and a visual target at the target position, the imager acquires a stream of images of the face presented in the acquisition field, and for each image of a plurality of successive images of said image stream:

the processing unit determines a new pose of the face in said each image of the plurality of successive images of said image stream, and determines a new position of the visual orientation mark in image corresponding to the new pose of the face with respect to the reference pose in said each image of the plurality of successive images of said image stream, the displayed image displayed by the screen is updated by moving the visual orientation mark in the displayed image to the new position of the visual orientation mark in the displayed image corresponding to the new pose of the face with respect to the reference pose in said each image of the plurality of successive images of said image stream, the processing unit authenticates the presented face when, following the successive displacement of the visual orientation mark on the successive new positions of said visual orientation mark in the successively updated displayed image, there is a match between a new position of the visual orientation mark successively moved in the updated displayed image and the target position where the visual target is located in the updated displayed image, corresponding to a match between the face pose and the target pose, otherwise the face presented in the acquisition field is considered as fraud.

2. The method according to claim 1, wherein the target space extends on either side of the reference position.

3. The method according to claim 1, wherein the target space corresponds to angular ranges of the pose angles defining a plurality of possible target positions.

4. The method according to claim 3, wherein the angles representative of the orientation of the face appearing in the image comprise a yaw angle about a vertical axis and a pitch angle about a horizontal axis, the angular ranges extending between ±10° and ±20° with respect to the pose angles of the reference pose.

5. The method according to claim 1, wherein the processing unit defines the target space also according to user data and/or elements contained in the initial image.

6. The method according to claim 1, wherein a time is allotted at the expiry of which, in the absence of match between the new position of the visual orientation mark and the target position where the visual target is located, the face presented in the acquisition field is considered as fraud.

7. The method according to claim 1, wherein the match between the new position of the visual orientation mark successively moved in the updated displayed image and the target position where the visual target is located in the updated displayed image, needs to be maintained for a predetermined duration before the processing unit authenticates the face.

8. The method according to claim 1, wherein, when the processing unit determines a reference pose, the processing unit transmits an order of movement of the face if the face pose does not correspond to a front view of the face.

9. The method according to claim 1, wherein the authentication of the presented face is also conditioned by the determination of the three-dimensional appearance of the presented face by implementing a photogrammetric reconstruction technique based on a movement from at least two face images of the image stream corresponding to two different poses.

10. The method according to claim 1, wherein the processing unit determines, for the plurality of successive images of the image stream, a direction of the face gaze by identifying an orientation of the eyes of said face on said images of said images of said successive images of the image stream, the authentication of the presented face is also conditioned on a gaze in a direction of the visual orientation mark and/or the visual target.

11. A computer-readable non-transitory medium comprising program code instructions stored thereon for performing the steps of a method according to claim 1 when said program is executed on a computer reading said non-transitory medium.

12. A device comprising an imager, a screen and a processing unit, said device being configured to implement a method according to claim 1.

* * * * *